United States Patent
Fiebig et al.

(10) Patent No.: US 10,640,685 B2
(45) Date of Patent: *May 5, 2020

(54) MULTI-LAYER BLOWN FILM

(71) Applicant: BOREALIS AG, Vienna (AT)

(72) Inventors: Joachim Fiebig, St. Marien (AT);
Kristin Reichelt, Neuhofen/Krems (AT)

(73) Assignee: BOREALIS AG, Veinna (AT)

(*) Notice: Subject to any disclaimer, the term of this patent is extended or adjusted under 35 U.S.C. 154(b) by 133 days.

This patent is subject to a terminal disclaimer.

(21) Appl. No.: 15/927,845

(22) Filed: Mar. 21, 2018

(65) Prior Publication Data

US 2018/0208800 A1 Jul. 26, 2018

Related U.S. Application Data

(63) Continuation of application No. 14/128,080, filed as application No. PCT/EP2012/061731 on Jun. 19, 2012, now Pat. No. 10,047,249.

(30) Foreign Application Priority Data

Jun. 27, 2011 (EP) ..................................... 11171471

(51) Int. Cl.
C08F 210/06 (2006.01)
C09J 7/38 (2018.01)
B32B 27/08 (2006.01)
B32B 27/32 (2006.01)
C08L 23/10 (2006.01)
C08L 23/14 (2006.01)
C09J 7/35 (2018.01)
B29D 7/01 (2006.01)
C08F 4/6592 (2006.01)

(52) U.S. Cl.
CPC ............... C09J 7/381 (2018.01); B29D 7/01 (2013.01); B32B 27/08 (2013.01); B32B 27/32 (2013.01); C08F 4/65925 (2013.01); C08F 210/06 (2013.01); C08L 23/10 (2013.01); C08L 23/142 (2013.01); C09J 7/35 (2018.01); B32B 2307/40 (2013.01); B32B 2439/00 (2013.01); Y10T 428/24967 (2015.01); Y10T 428/2826 (2015.01)

(58) Field of Classification Search
CPC .. C08F 210/06; C08F 4/65925; C08F 210/14; C08F 2500/03; C08F 2500/12; C08F 2500/15; C08F 2500/26; C08F 2/001; C08L 23/10; C08L 23/142; B29D 7/01; B32B 2307/40; B32B 2439/00; B32B 27/08; B32B 27/32; C09J 7/35; C09J 7/381; Y10T 428/24967; Y10T 428/2826
See application file for complete search history.

(56) References Cited

U.S. PATENT DOCUMENTS

2007/0215610 A1 9/2007 Su et al.

FOREIGN PATENT DOCUMENTS

| CN | 101506297 A | 8/2009 |
|---|---|---|
| EP | 0556815 A1 | 8/1993 |
| EP | 0560326 A1 | 9/1993 |
| EP | 2147939 A1 | 1/2010 |
| EP | 2159253 A1 | 3/2010 |
| EP | 2230273 A1 | 9/2010 |
| EP | 2386603 A1 | 11/2011 |
| JP | 0693146 | 11/1994 |
| JP | 2009234094 A | 10/2009 |
| JP | 2012-518069 A | 8/2012 |
| WO | 2006/057378 A1 | 6/2006 |
| WO | 2007/142720 A1 | 12/2007 |
| WO | 2010/102959 A1 | 9/2010 |
| WO | 2011/131637 A1 | 10/2011 |

OTHER PUBLICATIONS

Chinese Office Action dated Feb. 28, 2015.
Japanese Office Action dated Nov. 11, 2015.
Japanese Office Action dated Feb. 10, 2015.
Abstract of the cited prior art documents in the 1st OA D1(JP2000-191852A).
Abstract of the cited prior art documents in the 1st OA D1(JP2000-191853A).
Vincenzo Busico et al. "Microstructure of polypropylene", Prog. Polym. Sci. 26 (2001) 443-533.
Vincenzo Busico et al. "Full Assignment of the 13C NMR Spectra of Regioregular Polypropylenes: Methyl and Methylene Region", Macromolecules 1997, 30, 6251-6263.
Xenia Filip et al. "Heteronuclear decoupling under fast MAS by a rotor-synchronized Hahn-echo pulse train", Journal of Magnetic Resonance 176 (2005) 239-243.
John M. Griffin et al. "Low-load rotor-synchronised Hahn-echo pulse train (RS-HEPT) 1 H decoupling in solid-state NMR: factors affecting MAS spin-echo dephasing times".
Katja Klimke et al. "Optimisation and Application of Polyolefin Branch Quantification by Melt-State 13C NMR Spectroscopy", Macromol. Chem. Phys. 2006, 207, 382-395.

(Continued)

Primary Examiner — Lawrence D Ferguson
(74) Attorney, Agent, or Firm — Tarolli, Sundheim, Covell & Tummino LLP

(57) ABSTRACT

A multi-layer blown polymer film comprising a core layer (CL) and at least one sealing layer (SL), said sealing layer(s) (SL) comprise(s) a propylene copolymer composition (P) having a comonomer content in the range of 3.0 to 8.0 wt.-%, the comonomers are $C_5$ to $C_{12}$ α-olefins, said propylene copolymer composition (P) comprises a polypropylene (A) and a polypropylene (B) in the weight ratio [(A)/(B)] of 20/80 to 80/20, wherein said polypropylene (A) has a comonomer content of equal or below 4.0 wt.-%, the comonomers are $C_5$ to $C_{12}$ α-olefins, and said propylene copolymer (B) has a comonomer content of 4.0 to 20.0 wt.-%, the comonomers are $C_5$ to $C_{12}$ α-olefins.

7 Claims, No Drawings

(56) References Cited

OTHER PUBLICATIONS

M. Pollard et al. "Observation of Chain Branching in Polythylene in the Solid State and Melt via 13C NMR Spectroscopy and Melt NMR Relaxation Time Measurements", Macromolecules 2004, 37, 813-825.

Luigi Resconi et al. "Selectivity in Propene Polymerization with Metallocene Catalysts", Chem. Rev. 2000, 100, 1253-1345.

MULTI-LAYER BLOWN FILM

The present invention is directed to a new multi-layer blown polymer film comprising a sealing layer with good optical and sealing properties, as well as to its manufacture.

Polypropylenes are suitable for many applications. For instance polypropylene is applicable in areas where sealing properties play an important role, like in the food packing industry. Irrespectively from the polymer type, a polymer must fulfill at best all desired end properties and additionally must be easily processable, i.e. must withstand stress. However end properties and processing properties act often in a conflicting manner.

In many cases, the seal which is formed between the surfaces to be sealed is put under load while it is still warm. This means that the hot-tack properties of the polypropylene are crucial to ensure that a strong seal is formed even before cooling. But not only the hot tack strength should be rather high but also the heat sealing initiation temperature should be rather low. By operating at lower temperature there is the benefit that the article to be sealed is not exposed to high temperature. There are also economic advantages since lower temperatures are of course cheaper to generate and maintain. Further, all extrusion products have a window within which sealing may occur, i.e. in which the sealing layer becomes partly molten. Traditionally this sealing window has been rather narrow meaning that temperature control during the heat sealing process is critical. Accordingly a broad sealing window would be appreciated because in such a case the temperature control during heat sealing is less important.

Additionally the melting temperature of the used polypropylene should be rather high to avoid stickiness and blocking during the manufacture of the film material.

Finally for many applications the film material shall also have good optical properties.

Accordingly the object of the present invention is to provide a material enabling a skilled person to produce a multi-layer blown polymer film having high hot tack strength, low heat sealing initiation temperature (SIT), broad processing window, low stickiness and good optical properties.

The finding of the present invention is to provide a multi-layer blown polymer film comprising a core layer (CL) and sealing layer (SL) comprising a propylene copolymer composition (P) with rather high comonomer content, the comonomers are long chain α-olefins, and said propylene copolymer composition (P) comprises two different fractions, said fractions differ in the comonomer content.

Accordingly in a first embodiment the present invention is directed to a multi-layer blown polymer film, comprising (a) a core layer (CL) being selected from the group consisting of polyvinyl alcohols, polyacrylates, polyamides, poly (ethylene terephthalate), polyolefins (PO) and mixtures thereof, and (b) a sealing layer (SL), said sealing layer (SL) comprises a propylene copolymer composition (P), said propylene copolymer composition (P)

(c1) has a comonomer content in the range of 3.0 to 8.0 wt.-%, the comonomers are $C_5$ to $C_{12}$ α-olefins, (c2) comprises a polypropylene (A) and a polypropylene (B) in the weight ratio [(A)/(B)] of 20/80 to 80/20, preferably of 25/75 to 75/25, more preferably of 30/70 to 70/30, still more preferably of 35/65 to 50/50, wherein said polypropylene (A) has a comonomer content of equal or below 4.0 wt.-%, the comonomers are $C_5$ to $C_{12}$ α-olefins, and said propylene copolymer (B) has a comonomer content of 4.0 to 20.0 wt.-%, the comonomers are $C_5$ to $C_{12}$ α-olefins.

Alternatively (second embodiment) the present invention can be defined as a multi-layer blown polymer film, comprising (a) a core layer (CL) being selected from the group consisting of polyvinyl alcohols, polyacrylates, polyamides, poly (ethylene terephthalate), polyolefins (PO) and mixtures thereof, (b) a sealing layer (SL), said sealing layer (SL) comprises a propylene copolymer composition (P), said propylene copolymer composition (P) has (c1) a comonomer content in the range of 3.0 to 8.0 wt.-%, the comonomers are $C_5$ to $C_{12}$ α-olefins, (c2) a melting temperature Tm determined by differential scanning calorimetry (DSC) of at least 135° C., and (c3) a heat sealing initiation temperature (SIT) of equal or below 118° C., preferably of equal or below 115° C.

Different to multi-layer cast films the multi-layer blown polymer film of the present invention is drawn and thus oriented due to the bubble forming process. However the multi-layer blown polymer film differs also essentially from multi-layer biaxially oriented polymer films which have been stretched far more. Thus a multi-layer cast film, a multi-layer biaxially oriented polymer film as well as a multi-layer blown polymer film define different film types, being not comparable to each other.

It has surprisingly been found that such a multi-layer blown polymer film has a low heat sealing initiation temperature (SIT), a broad sealing window, a high hot tack strength and good optical properties (see example section).

In the following the invention is defined in more detail.

The multi-layer polymer blown film according to the instant invention comprises a core layer (CL) and at least one sealing layer (SL). Accordingly the multi-layer blown polymer film may comprise additional layers like an outer layer (OL) and/or a metal layer (ML). The metal layer (ML) is applied after the polymer layers, in particular the core layer (CL), the sealing layers (SL) and optionally the outer layer (OL) have been extruded, i.e. extruded on the blown film line.

In one preferred embodiment the multi-layer blown polymer film comprises at least three layers, namely at least one core layer (CL), and two sealing layers (SL), namely a first sealing layer (SL) and a second sealing layer (SL), wherein the multi-layer blown polymer film has the stacking order first sealing layer (SL)-core layer (CL)-second sealing layer (SL). Accordingly in one preferred embodiment the (two) sealing layer(s) are directly co-extruded with the core layer (CL). Thus in one specific preferred embodiment multi-layer blown polymer film consists of two sealing layers (SL) and one core layer (CL) having the stacking order first sealing layer (SL)-core layer (CL)-second sealing layer (SL). The first sealing layer (SL) and second sealing layer (SL) can be chemically different or identical. In one embodiment the first sealing layer (SL) and second sealing layer (SL) are chemically identical.

In another preferred embodiment the multi-layer blown polymer film comprises at least three layers, namely a core layer (CL), a sealing layer (SL) and a metal layer (ML), wherein the sealing layer (SL) is located, i.e. joined, on the one side (surface) of the core layer (CL) and the metal layer (ML) is located, i.e. joined, on the other side (surface) of the core layer (CL). Accordingly the multi-layer blown polymer film has the stacking order sealing layer (SL)-core layer (CL)-metal layer (ML). Preferably the sealing layer (SL) is co-extruded with the core layer (CL) on a blown film line and subsequently the core layer (CL) is metallized obtaining the metal layer (ML).

In another preferred embodiment the multi-layer blown polymer film comprises at least three layers, namely a core layer (CL), a sealing layer (SL) and a outer layer (OL), wherein the sealing layer (SL) is located, i.e. joined, on the one side (surface) of the core layer (CL) and the outer layer (OL) is located, i.e. joined, on the other side (surface) of the core layer (CL). Accordingly the multi-layer blown polymer film has the stacking order sealing layer (SL)-core layer (CL)-outer layer (OL). Preferably the sealing layer (SL) and the outer layer (OL) are co-extruded with the core layer (CL) on a blown film line.

The thickness of the core layer (CL) is preferably in the range of 5 to 500 μm, more preferably in the range of 10 to 50 μm.

Preferably the sealing layer(s) (SL) has/have a thickness that is substantially less than the thickness of the core layer (CL) and substantially less than the thickness of the total multi-layer blown polymer film. In one embodiment the thickness of the sealing layer(s) (SL) is/are substantially less, usually less than 20%, of the thickness of the core layer (CL). Accordingly it is appreciated that the sealing layer(s) (SL) has/have a thickness in the range of 0.5 to 40 μm, more preferably in the range of 1 to 25 μm.

The outer layer (OL)—if present—may have a thickness in the range of 0.5 to 50 μm, more preferably in the range of 1 to 30 μm.

Preferably the multi-layer blown polymer film is obtained by coextrusion. The extrusion coating is accomplished on a blown film line. The cooling of the layer can be effected by water cooling or air cooling, the latter being preferred. An especially preferred process for the preparation of a multi-layer blown film according to this invention is described in more detail below.

As used herein, the phrase "core layer" although singular, may refer to one or more layers, like to 2 to 5 layers, i.e. 2, 3, 4, or 5 layers, that form the core of the multi-layer blown polymer film. The core layer (CL) will typically be formed from a polymer selected from the group consisting of polyvinyl alcohol, polyacrylate, polyamide, polyester, like poly(ethylene terephthalate), polyolefin (PO) and mixtures thereof having desired properties or characteristics, such as good stiffness or barrier properties. Accordingly it is in particular preferred that the core layer (CL) is a polyolefin (PO), more preferably a polyethylene (PE) or polypropylene (PP), still more preferably a propylene homopolymer (H-PP) or a propylene copolymer (C-PP), the latter being preferred. In case of a propylene copolymer, said copolymer has preferably a comonomer content between 0.1 and 5 wt.-%, the comonomers are ethylene and/or $C_4$ to $C_8$ α-olefins, preferably ethylene, 1-butene or 1-hexene.

In one preferred embodiment the polypropylene (PP), preferably the propylene copolymer (C-PP), of the core layer (CL) has a melt flow rate $MFR_2$ (230° C.) measured according to ISO 1133 in the range of 1.0 to 15.0 g/10 min, more preferably in the range of 1.0 to 10.0 g/10 min.

The melting temperature Tm determined by differential scanning calorimetry (DSC) of the polypropylene (PP), more preferably of the propylene random copolymer (R-PP), is at least 135° C., preferably at least 140° C., more preferably in the range of 140 to 150° C., like in the range of 140 to 145° C.

The outer layer (OL)—if present—is preferably a polyolefin (PO) The polyolefin (PO) of the outer layer (OL) can be identical or different to the polyolefin (PO) of the core layer (CL). Accordingly with regard to the preferred polyolefin (PO) used as the outer layer (OL) reference is made to the information provided above for the polyolefin (PO) used as the core layer (CL). In one preferred embodiment the outer layer (OL) is a polyethylene (PE) or a polypropylene (PP).

As a further requirement the sealing layer(s) (SL) of the multi-layer blown polymer film must comprise a propylene copolymer composition (P). In a preferred embodiment the sealing layer(s) (SL) comprise(s) the propylene copolymer composition (P) as the only polymer component. Accordingly it is preferred that the amount of the propylene copolymer composition (P) within the sealing layer(s) (SL) is at least 70 wt.-%, more preferably at least 80 wt.-%, still more preferably at least 90 wt.-%, still yet more preferably at least 95 wt.-%, like at least 99 wt.-%. In one preferred embodiment the sealing layer(s) (SL) consist(s) of the propylene copolymer composition (P).

The propylene copolymer composition (P) according to this invention is featured by a rather high comonomer content. A "comonomer" according to this invention is a polymerizable unit different to propylene. Accordingly the propylene copolymer composition (P) according to this invention shall have a comonomer content of at least 2.5 wt.-%, more preferably of at least 3.0 wt.-%, more preferably of at least 3.3 wt.-%, still more preferably of at least 3.5 wt.-%, like of at least 3.8 wt.-%. Thus it is preferred that the propylene copolymer composition (P) according to this invention has a comonomer content in the range of 2.0 to 10.0 wt.-%, more preferably in the range of 3.0 to 8.0 wt.-%, still more preferably in the range of 3.2 to 7.5 wt.-%, still more preferably in the range of 3.3 to 7.5 wt.-%, like in the range of 3.5 to 6.5 wt.-%.

In a preferred embodiment the amount of comonomer within the sealing layer(s) (SL) is the same as for the propylene copolymer composition (P).

The comonomers of the propylene copolymer composition (P) are $C_5$ to $C_{12}$ α-olefins, e.g. 1-hexene and/or 1-octene. The propylene copolymer composition (P) of the present invention may contain more than one type of comonomer. Thus the propylene copolymer composition (P) of the present invention may contain one, two or three different comonomers, the comonomers are selected from the group of $C_5$ α-olefin, $C_6$ α-olefin, $C_7$ α-olefin, $C_8$ α-olefin, $C_9$ α-olefin, $C_{10}$ α-olefin, $C_{11}$ α-olefin, and $C_{12}$ α-olefin. However it is preferred that the propylene copolymer composition (P) contains only one type of comonomer. Preferably the propylene copolymer composition (P) comprises—apart from propylene—only 1-hexene and/or 1-octene. In an especially preferred embodiment the comonomer of the propylene copolymer composition (P) is only 1-hexene.

The propylene copolymer composition (P) as well as the propylene copolymer (B) and the propylene copolymer (C-A) according to this invention are preferably random propylene copolymers. The term "random copolymer" has to be preferably understood according to IUPAC (Pure Appl. Chem., Vol. No. 68, 8, pp. 1591 to 1595, 1996). Preferably the molar concentration of comonomer dyads, like 1-hexene dyads, obeys the relationship $$[HH]<[H]^2$$

wherein

[HH] is the molar fraction of adjacent comonomer units, like of adjacent 1-hexene units, and

[H] is the molar fraction of total comonomer units, like of total 1-hexene units, in the polymer.

Preferably the propylene copolymer composition (P) as well as the propylene copolymer (C-A) and the propylene copolymer (B) as defined in detail below are isotactic. Accordingly it is appreciated that the propylene copolymer composition (P), the propylene copolymer (C-A) and the propylene copolymer (B) have a rather high isotactic triad concentration, i.e. higher than 90%, more preferably higher than 92%, still more preferably higher than 93% and yet more preferably higher than 95%, like higher than 97%.

The molecular weight distribution (MWD) is the relation between the numbers of molecules in a polymer and the individual chain length. The molecular weight distribution (MWD) is expressed as the ratio of weight average molecular weight ($M_w$) and number average molecular weight ($M_n$). The number average molecular weight ($M_n$) is an average molecular weight of a polymer expressed as the first moment of a plot of the number of molecules in each molecular weight range against the molecular weight. In effect, this is the total molecular weight of all molecules divided by the number of molecules. In turn, the weight average molecular weight ($M_w$) is the first moment of a plot of the weight of polymer in each molecular weight range against molecular weight.

The number average molecular weight ($M_n$) and the weight average molecular weight ($M_w$) as well as the molecular weight distribution (MWD) are determined by size exclusion chromatography (SEC) using Waters Alliance GPCV 2000 instrument with online viscometer. The oven temperature is 140° C. Trichlorobenzene is used as a solvent (ISO 16014).

Accordingly it is preferred that the inventive propylene copolymer composition (P) has a weight average molecular weight ($M_w$) from 100 to 700 kg/mol, more preferably from 150 to 400 kg/mol.

The number average molecular weight ($M_n$) of the polypropylene is preferably in the range of 25 to 200 kg/mol, more preferably from 30 to 150 kg/mol.

Further it is appreciated that the molecular weight distribution (MWD) measured according to ISO 16014 is at least 2.5, preferably at least 3, more preferably in the range of 2.5 to 8, more preferably 3 to 5.

Furthermore, it is preferred that the propylene copolymer composition (P) of the present invention has a melt flow rate (MFR) given in a specific range. The melt flow rate measured under a load of 2.16 kg at 230° C. (ISO 1133) is denoted as $MFR_2$. Accordingly, it is preferred that in the present invention the propylene copolymer composition (P) has a melt flow rate $MFR_2$ measured according to ISO 1133 in the range of 2.0 to 50.0 g/10 min, more preferably in the range of 3.0 to 25.0 g/10 min, still more preferably in the range of 3.0 to 20.0 g/10 min, yet still more preferably in the range of 4.0 to 15.0 g/10 min.

In a preferred embodiment the molecular weight distribution (MWD), the weight average molecular weight ($M_w$), the number average molecular weight ($M_n$) and the melt flow rate (MFR) of the sealing layer(s) (SL) is the same as for the propylene copolymer composition (P) indicated above.

As mentioned above, the multi-layer blown polymer film shall be especially suitable for the packing industry. Accordingly good sealing properties are desired, like rather low heat sealing initiation temperature (SIT) and low stickiness.

Accordingly it is preferred that the sealing layer(s) (SL) and thus also the propylene copolymer composition (P) has/have a heat sealing initiation temperature (SIT) of not more than 118° C., more preferably of equal or below 115° C., still more preferably in the range of 90 to 118° C., yet more preferably in the range of 93 to equal or below 115° C.

Alternatively or additionally the multi-layer polymer blown film has a heat sealing initiation temperature (SIT) of not more than 118° C., more preferably of equal or below 115° C., still more preferably in the range of 90 to 118° C., yet more preferably in the range of 93 to equal or below 115° C.

But not only the heat sealing initiation temperature (SIT) shall be rather low but also the melting temperature ($T_m$) shall be rather high. Accordingly the difference between the melting temperature ($T_m$) and the heat sealing initiation temperature (SIT) shall be rather high. Thus it is preferred that the sealing layer(s) (SL) and/or the propylene copolymer composition (P) fulfill(s) the equation (I), more preferably the equation (Ia), still more preferably the equation (Ib), $$Tm-SIT \geq 22° \text{ C.} \tag{I}$$

$$Tm-SIT \geq 24° \text{ C.} \tag{Ia}$$

$$Tm-SIT \geq 27° \text{ C.} \tag{Ib}$$

wherein

Tm is the melting temperature given in centigrade [° C.] of the sealing layer(s) (SL) and/or of the propylene copolymer composition (P), SIT is the heat sealing initiation temperature (SIT) given in centigrade [° C.] of the sealing layer(s) (SL) and/or of the propylene copolymer composition (P).

The melting temperature ($T_m$) measured according to ISO 11357-3 of the sealing layer(s) (SL) and/or of the propylene copolymer composition (P) is preferably at least 125.0° C., more preferably of at least 128° C., still more preferably of at least 135° C., like at least 140° C. Thus it is in particular appreciated that the melting temperature ($T_m$) measured according to ISO 11357-3 of the sealing layer(s) (SL) and/or of the propylene copolymer composition (P) is in the range of 125 to 155° C., more preferably in the range of 128 to 150° C., still more preferably in the range of 135 to 155° C., still yet more preferably in the range of 135 to 150° C., like in the range of 140 to 150° C.

Additionally it is appreciated that the sealing layer(s) (SL) and/or the propylene copolymer composition (P) of the instant invention has/have a crystallization temperature ($T_c$) measured according to ISO 11357-3 of at least 88° C., more preferably of at least 90° C. Accordingly the sealing layer(s) (SL) and/or the propylene copolymer composition (P) has/have preferably a crystallization temperature ($T_c$) measured according to ISO 11357-3 in the range of 88 to 115° C., more preferably in the range of 90 to 110° C.

Additionally the sealing layer(s) (SL) and/or the propylene copolymer composition (P) can be defined by the xylene cold soluble (XCS) content. Accordingly the sealing layer(s) (SL) and/or the propylene copolymer composition (P) is/are preferably featured by a xylene cold soluble (XCS) content of below 25.0 wt.-%, more preferably of below 22.0 wt.-%, yet more preferably equal or below 20.0 wt.-%, still more preferably below 16.0 wt.-%. Thus it is in particular appreciated that the sealing layer(s) (SL) and/or the propylene copolymer composition (P) of the instant invention has/have a xylene cold soluble (XCS) content in the range of 0.5 to 25.0 wt.-%, more preferably in the range of 0.5 to 20.0 wt.-%, yet more preferably in the range of 0.5 to 16.0 wt.-%.

The amount of xylene cold soluble (XCS) additionally indicates that the sealing layer(s) (SL) and/or the propylene copolymer composition (P) is/are preferably free of any elastomeric polymer component, like an ethylene propylene rubber. In other words the sealing layer(s) (SL) and/or the propylene copolymer composition (P) shall be not a heterophasic polypropylene, i.e. a system consisting of a polypropylene matrix in which an elastomeric phase is dispersed. Such systems are featured by a rather high xylene cold soluble content. Accordingly in a preferred embodiment the propylene copolymer composition (P) comprises the polypropylene (A) and the propylene copolymer (B) as the only polymer components.

Similar to xylene cold solubles (XCS) the hexane hot soluble (HHS) indicate that part of a polymer which has a low isotacticity and crystallinity and which is soluble in hexane at 50° C.

Accordingly it is preferred that the sealing layer(s) (SL) and/or the propylene copolymer composition (P) has/have hexane hot solubles (HHS) measured according to FDA 177.1520 of not more than 2.5 wt.-%, more preferably not more than 2.0 wt.-%, like not more than 1.5 wt.-%.

The propylene copolymer composition (P) of the present invention is further defined by its polymer fractions present. Accordingly the propylene copolymer composition (P) of the present invention comprises at least, preferably consists of, two fractions, namely the polypropylene (A) and the propylene copolymer (B). Further the polypropylene (A) is preferably the comonomer lean fraction whereas the propylene copolymer (B) is the comonomer rich fraction.

Thus it is appreciated that the polypropylene (A) has a comonomer content of equal or below 5.0 wt.-%, more preferably of equal or below 4.0 wt.-%. Accordingly the polypropylene (A) can be a propylene homopolymer (H-A) or a propylene copolymer (C-A).

The expression homopolymer used in the instant invention relates to a polypropylene that consists of at least 99.5 wt.-%, more preferably of at least 99.8 wt.-%, of propylene units. In a preferred embodiment only propylene units in the propylene homopolymer are detectable.

In case the polypropylene (A) is a propylene copolymer (C-A) the comonomer content is in the range of 0.2 to equal or below 5.0 wt.-%, preferably in the range 0.5 to equal or below 4.0 wt.-%. More preferably the propylene copolymer (C-A) is a random propylene copolymer. The comonomers of the propylene copolymer (C-A) are $C_5$ to $C_{12}$ α-olefins, more preferably the comonomers of the propylene copolymer (C-A) are selected from the group of $C_5$ α-olefin, $C_6$ α-olefin, $C_7$ α-olefin, $C_8$ α-olefin, $C_9$ α-olefin, $C_{10}$ α-olefin, $C_{11}$ α-olefin, an $C_{12}$ α-olefin, still more preferably the comonomers of the propylene copolymer (C-A) are 1-hexene and/or 1-octene. The propylene copolymer (C-A) may contain more than one type of comonomer. Thus the propylene copolymer (C-A) of the present invention may contain one, two or three different comonomers. However it is preferred that the propylene copolymer (C-A) contains only one type of comonomer. Preferably the propylene copolymer (C-A) comprises—apart from propylene—only 1-hexene and/or 1-octene. In an especially preferred embodiment the comonomer of the propylene copolymer (C-A) is only 1-hexene.

Thus the propylene copolymer (C-A) is in one preferred embodiment a propylene copolymer of propylene and 1-hexene only, wherein the 1-hexene content is in the range of 0.2 to 5.0 wt.-%, preferably in the range of 0.5 to equal or below 4.0 wt.-%.

The propylene copolymer (B) has preferably a higher comonomer content than the polypropylene (A). Accordingly the propylene copolymer (B) has a comonomer content of equal or more than 2.5 wt.-% to 20.0 wt.-%, more preferably of equal or more than 3.0 to 15.0 wt.-%, still more preferably of equal or more than 4.0 to 12.0 wt.-%.

More preferably the propylene copolymer (B) is a random propylene copolymer.

The comonomers of the propylene copolymer (B) are $C_5$ to $C_{12}$ α-olefins, more preferably the comonomers of the propylene copolymer (B) are selected from the group of $C_5$ α-olefin, $C_6$ α-olefin, $C_7$ α-olefin, $C_8$ α-olefin, $C_9$ α-olefin, $C_{10}$ α-olefin, $C_{11}$ α-olefin, an $C_{12}$ α-olefin, still more preferably the comonomers of the propylene copolymer (B) are 1-hexene and/or 1-octene. The propylene copolymer (B) may contain more than one type of comonomer. Thus the propylene copolymer (B) of the present invention may contain one, two or three different comonomers. However it is preferred that the propylene copolymer (B) contains only one type of comonomer. Preferably the propylene copolymer (B) comprises—apart from propylene—only 1-hexene and/or 1-octene. In an especially preferred embodiment the comonomer of the propylene copolymer (B) is only 1-hexene.

Thus the propylene copolymer (B) is in a preferred embodiment a propylene copolymer of propylene and 1-hexene only, wherein the 1-hexene content is in the range of equal or more than 2.5 wt.-% to 20.0 wt.-%, more preferably of equal or more than 3.0 to 15.0 wt.-%, still more preferably of equal or more than 4.0 to 12.0 wt.-%.

It is in particular preferred that the comonomers of the propylene copolymer (C-A) and of the propylene copolymer (B) are the same. Accordingly in one preferred embodiment the propylene copolymer composition (P) of the instant invention comprises, preferably comprises only, a propylene copolymer (C-A) and a propylene copolymer (B), in both polymers the comonomer is only 1-hexene.

In another preferred embodiment the propylene copolymer composition (P) of the instant invention comprises, preferably comprises only, a propylene homopolymer (H-A) and a propylene copolymer (B), wherein the comonomers of the propylene copolymer (B) are selected from the group consisting of $C_5$ α-olefin, $C_6$ α-olefin, $C_7$ α-olefin, $C_8$ α-olefin, $C_9$ α-olefin, $C_{10}$ α-olefin, $C_{11}$ α-olefin, an $C_{12}$ α-olefin, preferably the comonomers of the propylene copolymer (B) are 1-hexene and/or 1-octene, more preferably the comonomer of the propylene copolymer (B) is 1-hexene only.

As mentioned above polypropylene (A) is preferably the comonomer lean fraction whereas the propylene copolymer (B) is the comonomer rich fraction. Accordingly the comonomer content in the polypropylene (A) is lower compared to the comonomer content of the propylene copolymer (B). Thus it is appreciated that the propylene copolymer composition (P) and the polypropylene (A) fulfil together the correlation [com (P)–com (A)] being at least 1.0, i.e. in the range of 1.0 to 6.0, more preferably being in the range of 1.0 to 4.5, still more preferably in the range of 1.5 to 4.0, wherein com (A) is the comonomer content of the polypropylene (A) given in weight percent [wt.-%], com (P) is the comonomer content of the propylene copolymer composition (P) given in weight percent [wt.-%].

One important aspect of the present invention is that the polypropylene (A) and the propylene copolymer (B) of the propylene copolymer composition (P) differ in the comonomer content. Additionally the polypropylene (A) and the propylene copolymer (B) of the propylene copolymer composition (P) may also differ in the melt flow rate. Accordingly the ratio MFR (A)/MFR (P) is equal or below 1.0, more preferably equal or below 0.70, yet more preferably equal or below 0.60, still more preferably equal or below 0.55, wherein MFR (A) is the melt flow rate MFR$_2$ (230° C.) [g/10 min] measured according to ISO 1133 of the polypropylene (A), MFR (P) is the melt flow rate MFR$_2$ (230° C.) [g/10 min] measured according to ISO 1133 of the propylene copolymer composition (P).

Further it is appreciated that the polypropylene (A) has a melt flow rate MFR$_2$ (230° C.) measured according to ISO 1133 of at least 0.5 g/10 min, more preferably of at least 1.5 g/10 min, still more preferably in the range of 1.0 to 8.0 g/10 min, still more preferably in the range of 1.5 to 7.0 g/10 min, yet more preferably in the range of 2.0 to 5.0 g/10 min, like in the range of 2.5 to 5.0 g/10 min.

As a high melt flow rate indicates a low molecular weight, it is appreciated that the polypropylene (A) has a weight average molecular weight (M$_w$) of below 450 kg/mol, still more preferably of below 400 kg/mol, yet more preferably in the range of 150 to below 450 kg/mol, like in the range of 180 to 400 kg/mol.

Further the polypropylene (A) has preferably a xylene cold soluble (XCS) content of below 2.5 wt.-%, more preferably of below 2.0 wt.-%, still more preferably in the range of 0.3 to 2.5 wt.-%, yet more preferably in the range of 0.3 to 2.0 wt.-%. It is in particular preferred that the propylene copolymer (A) has a lower xylene cold soluble (XCS) content than the propylene copolymer (B).

The propylene copolymer composition (P) may contain additives known in the art, like antioxidants, nucleating agents, slip agents and antistatic agents. The polymer fraction, preferably the sum of the polypropylene (A) and the propylene copolymer (B) fractions, is at least 90 wt.-%, more preferably at least 95 wt.-%, still more preferably at least 98 wt.-%, like at least 99 wt.-%.

In the following the preparation of the multi-layer blown polymer film is defined in more detail.

The polymers used for the core layer (CL) are known in the art and are not on focus in this invention. Typical commercially available polyvinyl alcohols, polyacrylates, polyamides, polyolefins (PO), like propylene homopolymer (H-PP), can be used for the core layer (CL).

The propylene copolymer composition (P) is preferably obtained by a sequential polymerization process comprising at least two reactors connected in series, wherein said process comprises the steps of (A) polymerizing in a first reactor (R-1) being a slurry reactor (SR), preferably a loop reactor (LR), propylene and optionally at least one C$_5$ to C$_{12}$ α-olefin, preferably 1-hexene, obtaining a polypropylene (A) as defined in the instant invention, (B) transferring said polypropylene (A) and unreacted comonomers of the first reactor in a second reactor (R-2) being a gas phase reactor (GPR-1), (C) feeding to said second reactor (R-2) propylene and at least one C$_5$ to C$_{12}$ α-olefin, (D) polymerizing in said second reactor (R-2) and in the presence of said first polypropylene (A) propylene and at least one C$_5$ to C$_{12}$ α-olefin obtaining a propylene copolymer (B) as defined in the instant invention, said polypropylene (A) and said propylene copolymer (B) form the propylene copolymer composition (P) as defined in the instant invention, wherein further in the first reactor (R-1) and second reactor (R-2) the polymerization takes place in the presence of a solid catalyst system (SCS), said solid catalyst system (SCS) comprises (i) a transition metal compound of formula (I)

$$R_n(Cp')_2MX_2 \qquad (I)$$

wherein

"M" is zirconium (Zr) or hafnium (Hf), each "X" is independently a monovalent anionic σ-ligand, each "Cp'" is a cyclopentadienyl-type organic ligand independently selected from the group consisting of substituted cyclopentadienyl, substituted indenyl, substituted tetrahydroindenyl, and substituted or unsubstituted fluorenyl, said organic ligands coordinate to the transition metal (M), "R" is a bivalent bridging group linking said organic ligands (Cp'), "n" is 1 or 2, preferably 1, and (ii) optionally a cocatalyst (Co) comprising an element (E) of group 13 of the periodic table (IUPAC), preferably a cocatalyst (Co) comprising a compound of Al.

Concerning the definition of the propylene copolymer composition (P), the polypropylene (A) and the propylene copolymer (B) it is referred to the definitions given above.

The term "sequential polymerization process" indicates that the propylene copolymer composition (P) is produced in at least two reactors connected in series. Accordingly, a decisive aspect of the present process is the preparation of the propylene copolymer composition (P) in two different reactors. Thus the present process comprises at least a first reactor (R-1) and a second reactor (R-2). In one specific embodiment the instant process consists of two polymerization reactors (R-1) and (R-2). The term "polymerization reactor" shall indicate that the main polymerization takes place. Thus in case the process consists of two polymerization reactors, this definition does not exclude the option that the overall process comprises for instance a pre-polymerization step in a pre-polymerization reactor. The term "consists of" is only a closing formulation in view of the main polymerization reactors.

The first reactor (R-1) is preferably a slurry reactor (SR) and can be any continuous or simple stirred batch tank reactor or loop reactor operating in bulk or slurry. Bulk means a polymerization in a reaction medium that comprises of at least 60% (wt/wt), preferably 100% monomer. According to the present invention the slurry reactor (SR) is preferably a (bulk) loop reactor (LR).

The second reactor (R-2) and any subsequent reactor are preferably gas phase reactors (GPR). Such gas phase reactors (GPR) can be any mechanically mixed or fluid bed reactors. Preferably the gas phase reactors (GPR) comprise a mechanically agitated fluid bed reactor with gas velocities of at least 0.2 m/sec. Thus it is appreciated that the gas phase reactor is a fluidized bed type reactor preferably with a mechanical stirrer.

The condition (temperature, pressure, reaction time, monomer feed) in each reactor is dependent on the desired product which is in the knowledge of a person skilled in the art. As already indicated above, the first reactor (R-1) is preferably a slurry reactor (SR), like a loop reactor (LR), whereas the second reactor (R-2) is preferably a gas phase reactor (GPR-1). The subsequent reactors—if present—are also preferably gas phase reactors (GPR).

A preferred multistage process is a "loop-gas phase"-process, such as developed by Borealis A/S, Denmark (known as BORSTAR® technology) described e.g. in patent literature, such as in EP 0 887 379 or in WO 92/12182.

Multimodal polymers can be produced according to several processes which are described, e.g. in WO 92/12182, EP 0 887 379, and WO 98/58976. The contents of these documents are included herein by reference.

Preferably, in the instant process for producing propylene copolymer composition (P) as defined above the conditions for the first reactor (R-1), i.e. the slurry reactor (SR), like a loop reactor (LR), of step (A) may be as follows:
the temperature is within the range of 40° C. to 110° C., preferably between 60° C. and 100° C., 70 to 90° C.,
the pressure is within the range of 20 bar to 80 bar, preferably between 40 bar to 70 bar,
hydrogen can be added for controlling the molar mass in a manner known per se.

Subsequently, the reaction mixture from step (A) is transferred to the second reactor (R-2), i.e. gas phase reactor (GPR-1), i.e. to step (D), whereby the conditions in step (D) are preferably as follows:
the temperature is within the range of 50° C. to 130° C., preferably between 60° C. and 100° C.,
the pressure is within the range of 5 bar to 50 bar, preferably between 15 bar to 40 bar,
hydrogen can be added for controlling the molar mass in a manner known per se.

The residence time can vary in both reactor zones.

In one embodiment of the process for producing propylene copolymer composition (P) the residence time in bulk reactor, e.g. loop is in the range 0.2 to 4 hours, e.g. 0.3 to 1.5 hours and the residence time in gas phase reactor will generally be 0.2 to 6.0 hours, like 0.5 to 4.0 hours.

If desired, the polymerization may be effected in a known manner under supercritical conditions in the first reactor (R-1), i.e. in the slurry reactor (SR), like in the loop reactor (LR), and/or as a condensed mode in the gas phase reactor (GPR-1).

The conditions in the other gas phase reactors (GPR), if present, are similar to the second reactor (R-2).

The present process may also encompass a pre-polymerization prior to the polymerization in the first reactor (R-1). The pre-polymerization can be conducted in the first reactor (R-1), however it is preferred that the pre-polymerization takes place in a separate reactor, so called pre-polymerization reactor.

In one specific embodiment the solid catalyst system (SCS) has a porosity measured according ASTM 4641 of less than 1.40 mug and/or a surface area measured according to ASTM D 3663 of lower than 25 m²/g.

Preferably the solid catalyst system (SCS) has a surface area of lower than 15 m²/g, yet still lower than 10 m²/g and most preferred lower than 5 m/g, which is the lowest measurement limit. The surface area according to this invention is measured according to ASTM D 3663 ($N_2$).

Alternatively or additionally it is appreciated that the solid catalyst system (SCS) has a porosity of less than 1.30 ml/g and more preferably less than 1.00 ml/g. The porosity has been measured according to ASTM 4641 ($N_2$). In another preferred embodiment the porosity is not detectable when determined with the method applied according to ASTM 4641 ($N_2$).

Furthermore the solid catalyst system (SCS) typically has a mean particle size of not more than 500 μm, i.e. preferably in the range of 2 to 500 μm, more preferably 5 to 200 μm. It is in particular preferred that the mean particle size is below 80 μm, still more preferably below 70 μm. A preferred range for the mean particle size is 5 to 70 μm, or even 10 to 60 μm.

As stated above the transition metal (M) is zirconium (Zr) or hafnium (Hf), preferably zirconium (Zr).

The term "σ-ligand" is understood in the whole description in a known manner, i.e. a group bound to the metal via a sigma bond. Thus the anionic ligands "X" can independently be halogen or be selected from the group consisting of R', OR', $SiR'_3$, $OSiR'_3$, $OSO_2CF_3$, OCOR', SR', $NR'_2$ or $PR'_2$ group wherein R' is independently hydrogen, a linear or branched, cyclic or acyclic, $C_1$ to $C_{20}$ alkyl, $C_2$ to $C_{20}$ alkenyl, $C_2$ to $C_{20}$ alkynyl, $C_3$ to $C_{12}$ cycloalkyl, $C_6$ to $C_{20}$ aryl, $C_7$ to $C_{20}$ arylalkyl, $C_7$ to $C_{20}$ alkylaryl, $C_8$ to $C_{20}$ arylalkenyl, in which the R' group can optionally contain one or more heteroatoms belonging to groups 14 to 16. In a preferred embodiments the anionic ligands "X" are identical and either halogen, like Cl, or methyl or benzyl.

A preferred monovalent anionic ligand is halogen, in particular chlorine (Cl).

The substituted cyclopentadienyl-type ligand(s) may have one or more substituent(s) being selected from the group consisting of halogen, hydrocarbyl (e.g. $C_1$ to $C_{20}$ alkyl, $C_2$ to $C_{20}$ alkenyl, $C_2$ to $C_{20}$ alkynyl, $C_3$ to $C_{20}$ cycloalkyl, like $C_1$ to $C_{20}$ alkyl substituted $C_5$ to $C_{20}$ cycloalkyl, $C_6$ to $C_{20}$ aryl, $C_5$ to $C_{20}$ cycloalkyl substituted $C_1$ to $C_{20}$ alkyl wherein the cycloalkyl residue is substituted by $C_1$ to $C_{20}$ alkyl, $C_7$ to $C_{20}$ arylalkyl, $C_3$ to $C_{12}$ cycloalkyl which contains 1, 2, 3 or 4 heteroatom(s) in the ring moiety, $C_6$ to $C_{20}$-heteroaryl, $C_1$ to $C_{20}$-haloalkyl, $—SiR''_3$, $—SR''$, $—PR''_2$ or $—NR''_2$, each R'' is independently a hydrogen or hydrocarbyl (e.g. $C_1$ to $C_{20}$ alkyl, $C_1$ to $C_{20}$ alkenyl, $C_2$ to $C_{20}$ alkynyl, $C_3$ to $C_{12}$ cycloalkyl, or $C_6$ to $C_{20}$ aryl) or e.g. in case of $—NR''_2$, the two substituents R'' can form a ring, e.g. five- or six-membered ring, together with the nitrogen atom wherein they are attached to.

Further "R" of formula (I) is preferably a bridge of 1 to 4 atoms, such atoms being independently carbon (C), silicon (Si), germanium (Ge) or oxygen (O) atom(s), whereby each of the bridge atoms may bear independently substituents, such as $C_1$ to $C_{20}$-hydrocarbyl, tri($C_1$ to $C_{20}$-alkyl)silyl, tri($C_1$ to $C_{20}$-alkyl)siloxy and more preferably "R" is a one atom bridge like e.g. $—SiR'''_2—$, wherein each R''' is independently $C_1$ to $C_2$-alkyl, $C_2$ to $C_{20}$-alkenyl, $C_2$ to $C_{20}$-alkynyl, $C_3$ to $C_{12}$ cycloalkyl, $C_6$ to $C_{20}$-aryl, alkylaryl or arylalkyl, or tri($C_1$ to $C_{20}$ alkyl)silyl-residue, such as trimethylsilyl-, or the two R''' can be part of a ring system including the Si bridging atom.

In a preferred embodiment the transition metal compound has the formula (II)

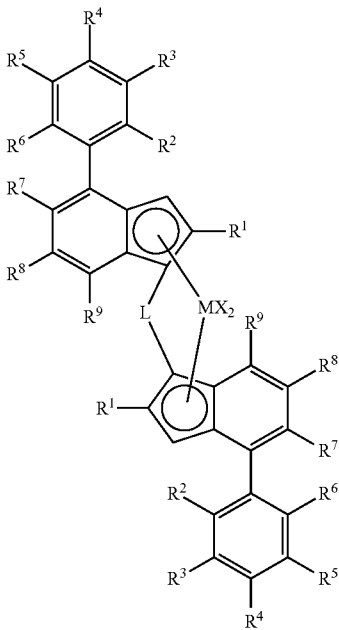

wherein
M is zirconium (Zr) or hafnium (Hf), preferably zirconium (Zr),
X are ligands with a σ-bond to the metal "M", preferably those as defined above for formula (I),
preferably chlorine (Cl) or methyl ($CH_3$), the former especially preferred,
$R^1$ are equal to or different from each other, preferably equal to, and are selected from the group consisting of linear saturated $C_1$ to $C_{20}$ alkyl, linear unsaturated $C_1$ to $C_{20}$ alkyl, branched saturated $C_1$-$C_{20}$ alkyl, branched unsaturated $C_1$ to $C_{20}$ alkyl, $C_3$ to $C_{20}$ cycloalkyl, $C_6$ to $C_{20}$ aryl, $C_7$ to $C_{20}$ alkylaryl, and $C_7$ to $C_{20}$ arylalkyl, optionally containing one or more heteroatoms of groups 14 to 16 of the Periodic Table (IUPAC),
preferably are equal to or different from each other, preferably equal to, and are $C_1$ to $C_{10}$ linear or branched hydrocarbyl, more preferably are equal to or different from each other, preferably equal to, and are $C_1$ to $C_6$ linear or branched alkyl,
$R^2$ to $R^6$ are equal to or different from each other and are selected from the group consisting of hydrogen, linear saturated $C_1$-$C_{20}$ alkyl, linear unsaturated $C_1$-$C_{20}$ alkyl, branched saturated $C_1$-$C_{20}$ alkyl, branched unsaturated $C_1$-$C_{20}$ alkyl, $C_3$-$C_{20}$ cycloalkyl, $C_6$-$C_{20}$ aryl, $C_7$-$C_{20}$ alkylaryl, and $C_7$-$C_{20}$ arylalkyl, optionally containing one or more heteroatoms of groups 14 to 16 of the Periodic Table (IUPAC),
preferably are equal to or different from each other and are $C_1$ to $C_{10}$ linear or branched hydrocarbyl, more preferably are equal to or different from each other and are $C_1$ to $C_6$ linear or branched alkyl,
$R^7$ and $R^8$ are equal to or different from each other and selected from the group consisting of hydrogen, linear saturated $C_1$ to $C_{20}$ alkyl, linear unsaturated $C_1$ to $C_{20}$ alkyl, branched saturated $C_1$ to $C_{20}$ alkyl, branched unsaturated $C_1$ to $C_{20}$ alkyl, $C_3$ to $C_{20}$ cycloalkyl, $C_6$ to $C_{20}$ aryl, $C_7$ to $C_{20}$ alkylaryl, $C_7$ to $C_{20}$ arylalkyl, optionally containing one or more heteroatoms of groups 14 to 16 of the Periodic Table (IUPAC), $SiR^{10}_3$, $GeR^{10}_3$, $OR^{10}$, $SR^{10}$ and $NR^{10}_2$, wherein $R^{10}$ is selected from the group consisting of linear saturated $C_1$-$C_{20}$ alkyl, linear unsaturated $C_1$ to $C_{20}$ alkyl, branched saturated $C_1$ to $C_{20}$ alkyl, branched unsaturated $C_1$ to $C_{20}$ alkyl, $C_3$ to $C_{20}$ cycloalkyl, $C_6$ to $C_{20}$ aryl, $C_7$ to $C_{20}$ alkylaryl, and $C_7$ to $C_{20}$ arylalkyl, optionally containing one or more heteroatoms of groups 14 to 16 of the Periodic Table (IUPAC),
and/or
$R^7$ and $R^8$ being optionally part of a $C_4$ to $C_{20}$ carbon ring system together with the indenyl carbons to which they are attached, preferably a $C_5$ ring, optionally one carbon atom can be substituted by a nitrogen, sulfur or oxygen atom,
$R^9$ are equal to or different from each other and are selected from the group consisting of hydrogen, linear saturated $C_1$ to $C_{20}$ alkyl, linear unsaturated $C_1$ to $C_{20}$ alkyl, branched saturated $C_1$ to $C_{20}$ alkyl, branched unsaturated $C_1$ to $C_{20}$ alkyl, $C_3$ to $C_{20}$ cycloalkyl, $C_6$ to $C_{20}$ aryl, $C_7$ to $C_{20}$ alkylaryl, $C_7$ to $C_{20}$ arylalkyl, $OR^{10}$, and $SR^{10}$,
preferably $R^9$ are equal to or different from each other and are H or $CH_3$,
wherein
$R^{10}$ is defined as before,
L is a bivalent group bridging the two indenyl ligands, preferably being a $C_2R^{11}_4$ unit or a $SiR^{11}_2$ or $GeR^{11}_2$, wherein,
$R^{11}$ is selected from the group consisting of H, linear saturated $C_1$ to $C_{20}$ alkyl, linear unsaturated $C_1$ to $C_{20}$ alkyl, branched saturated $C_1$ to $C_{20}$ alkyl, branched unsaturated $C_1$ to $C_{20}$ alkyl, $C_3$ to $C_{20}$ cycloalkyl, $C_6$ to $C_{20}$ aryl, $C_7$ to $C_{20}$ alkylaryl or $C_7$ to $C_{20}$ arylalkyl, optionally containing one or more heteroatoms of groups 14 to 16 of the Periodic Table (IUPAC),
preferably $Si(CH_3)_2$, $SiCH_3C_6H_{11}$, or $SiPh_2$,
wherein $C_6H_{11}$ is cyclohexyl.
Preferably the transition metal compound of formula (II) is $C_2$-symmetric or pseudo-$C_2$-symmetric. Concerning the definition of symmetry it is referred to Resconi et al. Chemical Reviews, 2000, Vol. 100, No. 4 1263 and references herein cited.
Preferably the residues $R^1$ are equal to or different from each other, more preferably equal, and are selected from the group consisting of linear saturated $C_1$ to $C_{10}$ alkyl, linear unsaturated $C_1$ to $C_{10}$ alkyl, branched saturated $C_1$ to $C_{10}$ alkyl, branched unsaturated $C_1$ to $C_{10}$ alkyl and $C_7$ to $C_{12}$ arylalkyl. Even more preferably the residues $R^1$ are equal to or different from each other, more preferably equal, and are selected from the group consisting of linear saturated $C_1$ to $C_6$ alkyl, linear unsaturated $C_1$ to $C_6$ alkyl, branched saturated $C_1$ to $C_6$ alkyl, branched unsaturated $C_1$ to $C_6$ alkyl and $C_7$ to $C_{10}$ arylalkyl. Yet more preferably the residues $R^1$ are equal to or different from each other, more preferably equal, and are selected from the group consisting of linear or branched $C_1$ to $C_4$ hydrocarbyl, such as for example methyl or ethyl.
Preferably the residues $R^2$ to $R^6$ are equal to or different from each other and linear saturated $C_1$ to $C_4$ alkyl or branched saturated $C_1$ to $C_4$ alkyl. Even more preferably the residues $R^2$ to $R^6$ are equal to or different from each other, more preferably equal, and are selected from the group consisting of methyl, ethyl, iso-propyl and tert-butyl.
Preferably $R^7$ and $R^8$ are equal to or different from each other and are selected from hydrogen and methyl, or they are part of a 5-methylene ring including the two indenyl ring carbons to which they are attached. In another preferred embodiment, $R^7$ is selected from $OCH_3$ and $OC_2H_5$, and $R^8$ is tert-butyl.

In a preferred embodiment the transition metal compound is rac-methyl(cyclohexyl)silanediyl bis(2-methyl-4-(4-tert-butylphenyl)indenyl)zirconium dichloride.

In a second preferred embodiment, the transition metal compound is rac-dimethylsilanediyl bis(2-methyl-4-phenyl-1,5,6,7-tetrahydro-s-indacen-1-yl)zirconium dichloride.

In a third preferred embodiment, the transition metal compound is rac-dimethylsilanediyl bis(2-methyl-4-phenyl-5-methoxy-6-tert-butylindenyl)zirconium dichloride.

As a further requirement the solid catalyst system (SCS) according to this invention must comprise a cocatalyst (Co) comprising an element (E) of group 13 of the periodic table (IUPAC), for instance the cocatalyst (Co) comprises a compound of Al.

Examples of such cocatalyst (Co) are organo aluminium compounds, such as aluminoxane compounds.

Such compounds of Al, preferably aluminoxanes, can be used as the only compound in the cocatalyst (Co) or together with other cocatalyst compound(s). Thus besides or in addition to the compounds of Al, i.e. the aluminoxanes, other cation complex forming cocatalyst compounds, like boron compounds can be used. Said cocatalysts are commercially available or can be prepared according to the prior art literature. Preferably however in the manufacture of the solid catalyst system only compounds of Al as cocatalyst (Co) are employed.

In particular preferred cocatalysts (Co) are the aluminoxanes, in particular the C1 to C10-alkylaluminoxanes, most particularly methylaluminoxane (MAO).

Preferably, the organo-zirconium compound of formula (I) and the cocatalyst (Co) of the solid catalyst system (SCS) represent at least 70 wt %, more preferably at least 80 wt %, even more preferably at least 90 wt %, even further preferably at least 95 wt % of the solid catalyst system. Thus it is appreciated that the solid catalyst system is featured by the fact that it is self-supported, i.e. it does not comprise any catalytically inert support material, like for instance silica, alumina or $MgCl_2$ or porous polymeric material, which is otherwise commonly used in heterogeneous catalyst systems, i.e. the catalyst is not supported on external support or carrier material. As a consequence of that the solid catalyst system (SCS) is self-supported and it has a rather low surface area.

In one embodiment the solid metallocene catalyst system (SCS) is obtained by the emulsion solidification technology, the basic principles of which are described in WO 03/051934. This document is herewith included in its entirety by reference.

Hence the solid catalyst system (SCS) is preferably in the form of solid catalyst particles, obtainable by a process comprising the steps of
a) preparing a solution of one or more catalyst components;
b) dispersing said solution in a second solvent to form an emulsion in which said one or more catalyst components are present in the droplets of the dispersed phase,
c) solidifying said dispersed phase to convert said droplets to solid particles and optionally recovering said particles to obtain said catalyst.

Preferably a first solvent, more preferably a first organic solvent, is used to form said solution. Still more preferably the organic solvent is selected from the group consisting of a linear alkane, cyclic alkane, aromatic hydrocarbon and halogen-containing hydrocarbon.

Moreover the second solvent forming the continuous phase is an inert solvent towards to catalyst components, The second solvent might be immiscible towards the solution of the catalyst components at least under the conditions (like temperature) during the dispersing step. The term "immiscible with the catalyst solution" means that the second solvent (continuous phase) is fully immiscible or partly immiscible i.e. not fully miscible with the dispersed phase solution.

Preferably the immiscible solvent comprises a fluorinated organic solvent and/or a functionalized derivative thereof, still more preferably the immiscible solvent comprises a semi-, highly- or perfluorinated hydrocarbon and/or a functionalized derivative thereof. It is in particular preferred, that said immiscible solvent comprises a perfluorohydrocarbon or a functionalized derivative thereof, preferably $C_3$-$C_{30}$ perfluoroalkanes, -alkenes or -cycloalkanes, more preferred $C_4$-$C_{10}$ perfluoro-alkanes, -alkenes or -cycloalkanes, particularly preferred perfluorohexane, perfluoroheptane, perfluorooctane or perfluoro (methylcyclohexane) or perfluoro (1,3-dimethylcyclohexane) or a mixture thereof.

Furthermore it is preferred that the emulsion comprising said continuous phase and said dispersed phase is a bi- or multiphasic system as known in the art. An emulsifier may be used for forming and stabilising the emulsion. After the formation of the emulsion system, said catalyst is formed in situ from catalyst components in said solution.

In principle, the emulsifying agent may be any suitable agent which contributes to the formation and/or stabilization of the emulsion and which does not have any adverse effect on the catalytic activity of the catalyst. The emulsifying agent may e.g. be a surfactant based on hydrocarbons optionally interrupted with (a) heteroatom(s), preferably halogenated hydrocarbons optionally having a functional group, preferably semi-, highly- or perfluorinated hydrocarbons as known in the art. Alternatively, the emulsifying agent may be prepared during the emulsion preparation, e.g. by reacting a surfactant precursor with a compound of the catalyst solution. Said surfactant precursor may be a halogenated hydrocarbon with at least one functional group, e.g. a highly fluorinated $C_{1-n}$ (suitably $C_{4-30}$ or $C_{5-15}$) alcohol (e.g. highly fluorinated heptanol, octanol or nonanol), oxide (e.g. propenoxide) or acrylate ester which reacts e.g. with a cocatalyst component, such as aluminoxane to form the "actual" surfactant.

In principle any solidification method can be used for forming the solid particles from the dispersed droplets. According to one preferable embodiment the solidification is effected by a temperature change treatment. Hence the emulsion subjected to gradual temperature change of up to 10° C./min, preferably 0.5 to 6° C./min and more preferably 1 to 5° C./min. Even more preferred the emulsion is subjected to a temperature change of more than 40° C., preferably more than 50° C. within less than 10 seconds, preferably less than 6 seconds.

For further details, embodiments and examples of the continuous and dispersed phase system, emulsion formation method, emulsifying agent and solidification methods reference is made e.g. to the above cited international patent application WO 03/051934.

All or part of the preparation steps can be done in a continuous manner. Reference is made to WO 2006/069733 describing principles of such continuous or semicontinuous preparation methods of the solid catalyst types, prepared via emulsion/solidification method.

The above described catalyst components are prepared according to the methods described in WO 01/48034.

The multi-layer blown polymer film of the instant invention is obtained by coextruding the core layer (CL) on the one side with a propylene copolymer composition (P) obtaining the sealing layer (SL). Optionally on the other side of the core layer (CL) an outer layer (OL), a second sealing layer (SL) or a metal layer (ML) can be placed. The second sealing layer (SL) is preferably made also from a propylene copolymer composition (P) according to this invention. Concerning the outer layer (OL) reference is made to the information provided above.

The layered structure of the multi-layer blown polymer film of the invention is formed by blown film extrusion, more preferably by a blown film coextrusion process.

It is in particular preferred that the multi-layer blown polymer film is not subjected an stretching step as used for the manufacture of multi-layer biaxially oriented polymer films.

In the blown film coextrusion process the polymer the melts of the polymer for the core layer (CL), of the propylene copolymer composition (P) for the sealing layer (SL) and optionally of the polymer for the outer layer (OL) or for a further sealing layer (SL) are extruded through an annular die and blown into a tubular film by forming a bubble which is collapsed between nip rollers after solidification. The blown coextrusion can be preferably effected at a temperature in the range 160 to 240° C., and cooled by water or preferably by blowing gas (generally air) at a temperature of 10 to 50° C. to provide a frost line height of 0.5 to 8 times the diameter of the die. The blow up ratio should generally be in the range of from 1.5 to 4, such as from 2 to 4, preferably 2.5 to 3.5.

Optionally one or both, surface (s) of the multi-layer blown polymer film can be corona- or flame-treated by one of the known methods. For the corona treatment, the film is passed between two conductor elements serving as electrodes, with such a high voltage, usually an alternating voltage (about 10000 V and 10000 Hz), being applied between the electrodes that spray or corona discharges can occur. Due to the spray or corona discharge, the air above the film surface is ionized and reacts with the molecules of the film surface, causing formation of polar inclusions in the essentially non-polar polymer matrix. The treatment intensities are in the usual range, preferably from 38 to 48 dynes/cm after production.

Furthermore the present invention is also directed to the use of the inventive multi-layer blown polymer film as packing material, in particular as a packing material for food and/or non-food products like textiles, flowers, carton boxes containing tobacco product or perfumes.

In the following, the present invention is described by way of examples.

EXAMPLES

A. Measuring Methods

The following definitions of terms and determination methods apply for the above general description of the invention as well as to the below examples unless otherwise defined.

Quantification of Microstructure by NMR Spectroscopy

Quantitative nuclear-magnetic resonance (NMR) spectroscopy was used to quantify the isotacticity, regio-regularity and comonomer content of the polymers.

Quantitative $^{13}C\{^1H\}$ NMR spectra recorded in the molten-state using a Bruker Advance III 500 NMR spectrometer operating at 500.13 and 125.76 MHz for $^1H$ and $^{13}C$ respectively. All spectra were recorded using a $^{13}C$ optimised 7 mm magic-angle spinning (MAS) probehead at 180° C. using nitrogen gas for all pneumatics. Approximately 200 mg of material was packed into a 7 mm outer diameter zirconia MAS rotor and spun at 4 kHz. Standard single-pulse excitation was employed utilising the NOE at short recycle delays (as described in Pollard, M., Klimke, K., Graf, R., Spiess, H. W., Wilhelm, M., Sperber, O., Piel, C., Kaminsky, W., Macromolecules 2004, 37, 813, and in Klimke, K., Parkinson, M., Piel, C., Kaminsky, W., Spiess, H. W., Wilhelm, M., Macromol. Chem. Phys. 2006, 207, 382) and the RS-HEPT decoupling scheme (as described in Filip, X., Tripon, C., Filip, C., J. Mag. Resn. 2005, 176, 239, and in Griffin, J. M., Tripon, C., Samoson, A., Filip, C., and Brown, S. P., Mag. Res. in Chem. 2007, 45, S1, S198). A total of 1024 (1 k) transients were acquired per spectra.

Quantitative $^{13}C\{^1H\}$ NMR spectra were processed, integrated and relevant quantitative properties determined from the integrals. All chemical shifts are internally referenced to the methyl isotactic pentad (mmmm) at 21.85 ppm.

The tacticity distribution was quantified through integration of the methyl region in the $^{13}C\{^1H\}$ spectra, correcting for any signal not related to the primary (1,2) inserted propene stereo sequences, as described in Busico, V., Cipullo, R., Prog. Polym. Sci. 2001, 26, 443 and in Busico, V., Cipullo, R, Monaco, G., Vacatello, M., Segre, A. L., Macromolecules 1997, 30, 6251.

Characteristic signals corresponding to regio defects were observed (Resconi, L., Cavallo, L., Fait, A., Piemontesi, F., Chem. Rev. 2000, 100, 1253). The influence of regio defects on the quantification of the tacticity distribution was corrected for by subtraction of representative regio defect integrals from specific integrals of the stereo sequences.

The isotacticity was determined at the triad level and reported as the percentage of isotactic triad mm with respect to all triad sequences:

% $mm-(mm/(mm+mr+rr))*100$

Characteristic signals corresponding to the incorporation of 1-hexene were observed, and the 1-hexene content was calculated as the mole percent of 1-hexene in the polymer, H (mol %), according to:

$[H]=H_{tot}/(P_{tot}+H_{tot})$ where:

$H_{tot}=I(\alpha B_4)/2+I(\alpha\alpha B_4)\times 2$ where $I(\alpha B_4)$ is the integral of the $\alpha B_4$ sites at 44.1 ppm, which identifies the isolated 1-hexene incorporated in PPHPP sequences, and $I(\alpha\alpha B_4)$ is the integral of the $\alpha\alpha B_4$ sites at 41.6 ppm, which identifies the consecutively incorporated 1-hexene in PPHHPP sequences.

$P_{tot}$=Integral of all CH3 areas on the methyl region with correction applied for underestimation of other propene units not accounted for in this region and overestimation due to other sites found in this region.

and $H$(mol %)=100×$[H]$ which is then converted into wt % using the correlation $H$(wt %)=(100×$H$mol %×84.16)/($H$mol %×84.16+ (100−$H$mol %)×42.08)

A statistical distribution is suggested from the relationship between the content of hexene present in isolated (PPHPP) and consecutive (PPHHPP) incorporated comonomer sequences:

$[HH]<[H]^2$

Calculation of comonomer content of the propylene copolymer (B):

$$\frac{C(P) - w(A) \times C(A)}{w(B)} = C(B)$$

wherein w(A) is the weight fraction of the polypropylene (A), w(B) is the weight fraction of the propylene copolymer (B), C(A) is the comonomer content [in wt.-%] measured by $^{13}$C NMR spectroscopy of the polypropylene (A), i.e. of the product of the first reactor (R1), C(P) is the comonomer content [in wt.-%] measured by $^{13}$C NMR spectroscopy of the propylene copolymer composition (P), C(B) is the calculated comonomer content [in wt.-%] of the propylene copolymer (B)

Mw, Mn, MWD

Mw/Mn/MWD are measured by Gel Permeation Chromatography (GPC) according to the following method:

The weight average molecular weight (Mw), the number average molecular weight (Mn), and the molecular weight distribution (MWD=Mw/Mn) is measured by a method based on ISO 16014-1:2003 and ISO 16014-4:2003. A Waters Alliance GPCV 2000 instrument, equipped with refractive index detector and online viscometer is used with 3×TSK-gel columns (GMHXL-HT) from TosoHaas and 1,2,4-trichlorobenzene (TCB, stabilized with 200 mg/L 2,6-Di tert butyl-4-methyl-phenol) as solvent at 145° C. and at a constant flow rate of 1 mL/min. 216.5 µL of sample solution are injected per analysis. The column set is calibrated using relative calibration with 19 narrow MWD polystyrene (PS) standards in the range of 0.5 kg/mol to 11 500 kg/mol and a set of well characterized broad polypropylene standards. All samples are prepared by dissolving 5 to 10 mg of polymer in 10 mL (at 160° C.) of stabilized TCB (same as mobile phase) and keeping for 3 hours with continuous shaking prior sampling in into the GPC instrument.

Melt Flow Rate (MFR)

The melt flow rates are measured with a load of 2.16 kg (MFR$_2$) at 230° C. The melt flow rate is that quantity of polymer in grams which the test apparatus standardised to ISO 1133 extrudes within 10 minutes at a temperature of 230° C. under a load of 2.16 kg. Calculation of melt flow rate MFR$_2$ (230° C.) of the propylene copolymer (B):

$$MFR(B) = 10^{\left[\frac{\log(MFR(P)) - w(A) \times \log(MFR(A))}{w(B)}\right]}$$

wherein w(A) is the weight fraction of the polypropylene (A), w(B) is the weight fraction of the propylene copolymer (B), MFR(A) is the melt flow rate MFR$_2$ (230° C.) [in g/10 min] measured according ISO 1133 of the polypropylene (A), MFR(P) is the melt flow rate MFR$_2$ (230° C.) [in g/10 min] measured according ISO 1133 of the propylene copolymer composition (P), MFR(B) is the calculated melt flow rate MFR$_2$ (230° C.) [in g/10 min] of the propylene copolymer (B).

Xylene Cold Soluble Fraction (XCS Wt %)

Content of xylene cold solubles (XCS) is determined at 25° C. according ISO 16152; first edition; 2005 Jul. 1.

Hexane Solubles

FDA section 177.1520

1 g of a polymer film of 100 µm thickness is added to 400 ml hexane at 50° C. for 2 hours while stirring with a reflux cooler.

After 2 hours the mixture is immediately filtered on a filter paper No 41.

The precipitate is collected in an aluminium recipient and the residual hexane is evaporated on a steam bath under N$_2$ flow.

The amount of hexane solubles is determined by the formula ((wt. sample+wt. crucible)−(wt crucible))/(wt. sample)·100.

Melting temperature T$_m$, crystallization temperature T$_c$, is measured with Mettler TA820 differential scanning calorimetry (DSC) on 5-10 mg samples. Both crystallization and melting curves were obtained during 10° C./min cooling and heating scans between 30° C. and 225° C. Melting and crystallization temperatures were taken as the peaks of endotherms and exotherms.

Also the melt- and crystallization enthalpy (Hm and Hc) were measured by the DSC method according to ISO 11357-3.

Porosity: BET with N$_2$ gas, ASTM 4641, apparatus Micromeritics Tristar 3000; sample preparation: at a temperature of 50° C., 6 hours in vacuum.

Surface area: BET with N$_2$ gas ASTM D 3663, apparatus Micromeritics Tristar 3000: sample preparation at a temperature of 50° C., 6 hours in vacuum.

Mean particle size is measured with Coulter Counter LS200 at room temperature with n-heptane as medium; particle sizes below 100 nm by transmission electron microscopy Sealing initiation temperature (SIT); sealing end temperature (SET), sealing range: The method determines the sealing temperature range (sealing range) of polymer films. The sealing temperature range is the temperature range, in which the films can be sealed according to conditions given below.

The lower limit (heat sealing initiation temperature (SIT)) is the sealing temperature at which a sealing strength of >1 N is achieved. The upper limit (sealing end temperature (SET)) is reached, when the films stick to the sealing device.

The sealing range is determined on a DTC Hot tack tester Model 52-F/201 with a film of 25 µm thickness with the following further parameters:

Specimen width: 25 mm
Seal Pressure: 0.66 N/mm$^2$
Seal Time: 1 sec
Cool time: 30 sec
Peel Speed: 42 mm/sec
Start temperature: 80° C.
End temperature: 150° C.

Specimen is sealed sealing layer (SL) to sealing layer (SL) at each sealbar temperature and seal strength (force) is determined at each step. All values of the SIT and SET were measured on the multi-layer film, like the three layer film as used in the examples. In cases where the SIT and SET refer to the propylene copolymer composition (P) or the sealing layer (SL) as such the SIT and SET were measured on a monolayer cast film of the propylene copolymer composition (P) and the sealing layer (SL), respectively, having a thickness of 100 µm as described in application No. 10 160 631.7. and application No. 10 160 611.9. Sealing Strength is the force measured at the temperature defined in Table 2

Hot Tack Force:

The hot tack force is determined on a DTC Hot tack tester Model 52-F/201 with a film of 25 μm thickness with the following further parameters:
Specimen width: 25 mm
Seal Pressure: 1.2 N/mm²
Seal Time: 0.5 sec
Cool time: 0.2 sec
Peel Speed: 200 mm/sec
Start temperature: 90° C.
End temperature: 140° C.

The maximum hot tack force, i.e the maximum of a force/temperature diagram is determined and reported.

Hot tack initiation temperature: is determined from the hot tack curve at the point where the force exceeds 1 N Gloss was determined on the multi-layered films according to DIN 67530 at an angle of 20° C.

Transparency, haze and clarity were determined on the multi-layered films according to ASTM D 1003-00.

B. Examples

The propylene copolymer compositions (P) of table I have been produced in a Borstar PP pilot plant in a two-step polymerization process starting in a bulk-phase loop reactor followed by polymerization in a gas phase reactor, varying the molecular weight as well as hexene content by appropriate hydrogen and comonomer feeds. The catalyst used in the polymerization process was a metallocene catalyst as described in example 10 of WO 2010/052263 A1.

TABLE 1

Preparation of the propylene copolymer composition (P)

|  |  | P 1 | P2 | P 3 | P4 |
|---|---|---|---|---|---|
| Loop |  |  |  |  |  |
| MFR₂ | [g/10 min] | 4.6 | 4.3 | 3.4 | 4.0 |
| C6 | [wt.-%] | 0.0 | 0.0 | 1.2 | 1.2 |
| XCS | [wt.-%] | <1.5 | <1.5 | <1.5 | <1.5 |
| GPR |  |  |  |  |  |
| C6 | [wt.-%] | 5.5 | 5.8 | 5.9 | 7.4 |
| Split Loop/GPR | [%] | 39/61 | 34/66 | 47/53 | 45/55 |
| FINAL |  |  |  |  |  |
| C6 | [wt.-%] | 3.2 | 3.8 | 3.6 | 4.4 |
| XCS | [wt.-%] | 2 | 1.9 | 2.3 | 5.5 |
| HHS | [wt.-%] | 0.7 | 0.8 | 0.8 | 0.9 |
| MFR₂ | [g/10 min] | 8.6 | 10.0 | 8.2 | 7.9 |
| Mw | [kg/mol] | 226 | 211 | 224 | 210 |
| MWD | [—] | 3.0 | 3.0 | 2.9 | 2.9 |
| SIT | [° C.] | nm | 108 | nm | 102 |
| Tm | [° C.] | 148 | 149 | 141 | 141 |
| Tc | [° C.] | 111 | 101 | 97 | 100 |

Loop defines the polypropylene (A)
GPR defines the propylene copolymer (B)
Final defines the propylene copolymer (P)
C6 is 1-hexene content
HHS hexane hot solubles
SIT Sealing initiation temperature measured on a monolayer film [100 μm] asdescribed in application Ser. No. 10/160,631.7. and application Ser. No. 10/160,611.9
nm not measured
P5 is the commercial propylene-ethylene-1-butene terpolymer TD210BF of Borealis AG having a melt flow rate MFR₂ (230° C.) of 6 g/10 min, a melting temperature Tm of 131° C. and a MWD of 4.9.
P6 is the commercial random ethylene-propylene copolymer RB709CF of Borealis AG having a melt flow rate MFR₂ (230° C.) of 1.5 g/10 min and a melting temperature Tm of 137° C.
R-PP is the commercial polypropylene homopolymer RB707BF of Borealis AG having a melt flow rate MFR₂ (230° C.) of 1.5 g/10 min, a melting temperature Tm of 145° C.

Three layer blown polymer films were produced on a three layer blown film line. The melt temperature of the scaling layers (SL) was 185° C. to 195° C. The melt temperature of the core layer (CL) was in the range of 205° C. to 215° C. The throughput of the extruders was in sum 80 kg/h. The film structure was SL-CL-SL with a core layer of 25 μm (CL) and two sealing layers (SL) of 12.5 μm. For the core layer (CL) R-PP has been used, whereas for the sealing layers (SL) one of the polymers P1 to P6 have been used. Layer thickness has been

TABLE 2

Properties of the multi-layer blown polymer film

|  |  | CE1 P5 | CE2 P6 | IE1 P1 | IE2 P2 | IE3 P3 | IE4 P4 |
|---|---|---|---|---|---|---|---|
| HTF | [N] | 2.7 | 1.8 | 3.6 | 3.5 | 4.0 | 3.5 |
| HT-IT | [° C.] | 98 | 103 | 101 | 93 | 96 | 93 |
| SS (A) | [N] | 3.3 | <2 | <2 | <2 | 6 | 17 |
| SS (B) | [N] | 20 | 4 | 10 | 18 | 22 | 23 |
| SIT | [° C.] | 110 | 116 | 113 | 113 | 110 | 107 |
| G | [%] | 27 | 91 | 67 | 66 | 81 | 81 |
| T | [%] | 94 | 94 | 94 | 95 | 95 | 95 |
| H | [%] | 22 | 2.4 | 7.4 | 3.2 | 5.1 | 3.3 |
| C | [%] | 79 | 97 | 96 | 93 | 97 | 96 |

HTF is the hot tack force
HT-IT Hot Tack initiation temperature at F. > 1N (see page 33)
SS(A) is the sealing strength at 110° C.
SS(B) is the sealing strength at 115° C.
SIT is the heat sealing initiation temperature
G Gloss 20°
T Transparency
H Haze
C Clarity

The invention claimed is:

1. Process for producing a multi-layer blown polymer film comprising: providing a core layer (CL) being selected from the group consisting of polyvinyl alcohols, polyacrylates, polyamides, poly(ethylene terephthalate), polyolefins (PO) and mixtures thereof, a sealing layer (SL), and optionally an outer (OL), a further sealing layer (SL) or a metal layer (ML) wherein:

(a) the core layer (CL),
(a1) is coated on the one side with a propylene copolymer composition (P) obtaining a sealing layer (SL) and
(a2) optionally
(a2-i) is on the other side coated with a polyolefin (PO) obtaining an outer layer (OL), or
(a2-ii) is on the other side coated with a propylene copolymer composition (P) obtaining a second sealing layer (SL), or
(a2-iii) is on the other side metallized obtaining a metal layer (ML), wherein
(b) said propylene copolymer composition (P)
(b1) has a comonomer content in the range of 3.0 to 8.0 wt. %, the comonomer is C6 α-olefin,
(b2) comprises a polypropylene (A) and a polypropylene (B) in the weight ratio [(A)/(B)] of 35/65 to 50/50, wherein said polypropylene (A) is a propylene homopolymer (H-PP) or a propylene copolymer (C-A) having a comonomer content of below 4.0 wt. %, the comonomer is C6 α-olefin, said propylene copolymer (B) has a comonomer content of 4.0 to 20.0 wt. %, the comonomer is C6 α-olefin,
(b3) fulfills the ratio $$MFR\,(A)/MFR\,(P) \leq 1.0$$

wherein MFR (A) is the melt flow rate MFR2 (230° C.) [g/10 min] measured according to ISO 1133 of the polypropylene (A), MFR (P) is the melt flow rate MFR2 (230° C.) [g/10 min] measured according to ISO 1133 of the propylene copolymer composition (P), (b4) has a xylene soluble content (XCS) determined at 25° C. according to ISO 16152 of below 16.0 wt. %, (b5) has a melting temperature Tm determined by differential scanning calorimetry (DSC) of at least 135° C., (b6) has a heat sealing initiation temperature (SIT) of equal or below 115° C., (b7) is free of any elastomeric polymer component, and wherein the film is not subjected to a stretching step, and coextruding the polymer layers on a blown film line.

2. Process according to claim 1, wherein the melts of the polymer for the core layer (CL), of the propylene copolymer composition (P) for the sealing layer (SL) and optionally of the polymer for the outer layer (OL) or for a further sealing layer (SL) are extruded through an annular die and blown into a tubular film by forming a bubble which is collapsed between nip rollers after solidification.

3. Process according to claim 1, wherein the blown coextrusion is effected at a temperature in the range 160 to 240° C., and cooled by water or by blowing gas at a temperature of 10 to 50° C. to provide a frost line height of 0.5 to 8 times the diameter of the die.

4. Process according to claim 1, wherein the blow up ratio is in the range from 1.5 to 4.

5. Process according to claim 1, wherein the multi-layer film is corona-treated or flame-treated.

6. Process according to claim 1, wherein the corona treatment or flame treatment is carried out by passing the film between two conductor elements serving as electrodes with high voltage.

7. Process according to claim 1, wherein the corona treatment or flame treatment is carried out by passing the film between two conductor elements serving as electrodes with a high alternating voltage of about 10000 V and 10000 Hz.

* * * * *